United States Patent Office 3,419,488
Patented Dec. 31, 1968

3,419,488
ELECTRO-DEPOSITION OF PAINT USING AN ION EXCHANGE MEMBRANE
Brian Alfred Cooke, Chalfont St. Peter, England, assignor to Imperial Chemical Industries Limited, London, England, a corporation of Great Britain
No Drawing. Filed Apr. 5, 1965, Ser. No. 445,771
Claims priority, application Great Britain, Apr. 8, 1964, 14,538/64
7 Claims. (Cl. 204—181)

ABSTRACT OF THE DISCLOSURE

A process of electro-deposition of a film-forming material by passing an electric current through an aqueous dispersion of the material between an article to be coated and another electrode. The other electrode is separated from the aqueous dispersion or solution by an ion-exchange membrane selectively permeable to ions attracted to the other electrode.

---

This invention relates to a rocess of electro-depositing coatings on articles immersed in a liquid coating composition.

In such a process the articles are immersed in an aqueous dispersion (which term includes a molecular dispersion, i.e. solution) of an ionised film-forming material such as a synthetic resin and an electric current is passed between the articles and another electrode to cause deposition of a coating of film-forming material on the articles. The articles are then withdrawn from the liquid and, depending on the nature of the film-forming material, are air-dried or stoved.

The synthetic resins most commonly used as the film-forming material are ones containing acidic groups which are neutralised by a base to render them water-dispersible. Typical film-forming materials of this type are maleinised oils, alkyd resins, usually of low molecular weight and high acid value, and vinyl copolymers containing acid groups. Examples of maleinised oils are maleinised linseed oil, maleinised dehydrated caster oil and fumarised tung oil. Examples of alkyd resins are trimellitic anhydride resins and coconut oil alkyds of high acid value, and these may optionally be blended with phenolic resins. Examples of vinyl copolymers are acidic acrylic copolymers such as butyl acrylate/acrylic acid copolymer and ethyl acrylate/itaconic acid/acrylamide 85/10/5 copolymer.

These resins are anionic in nature and, when dispersed in water and subjected to an electric field, they migrate to the anode.

The resins are dispersed in water by partial or complete neutralisation with a base, usually an amine (in which term ammonia is included). As the resin is deposited on the article to be coated, this being made the anode, there is a release of a corresponding amount of the neutraliser, i.e. base, by discharge at the cathode and unless the base is sufficiently volatile for it to evaporate from the solution there is a tendency for it to accumulate in the coating bath. This leads to uncontrollable changes in the pH value of the coating bath and generally is undesirable.

A similar phenomenon occurs when the film-forming material is a cationic resin, for example, an amine-terminated polyamide or acrylic polymer. This type of material is made water-dispersible by partial or complete neutralisation with an acid such as acetic acid, and when the material is deposited on the article to be coated, in this case the cathode, a corresponding amount of the neutraliser, i.e. acid, is discharged at the anode. Again, it is disadvantageous to have this acid accumulate in the coating bath.

This invention provides an improved process in which the accumulation of base or acid in the coating bath itself can be avoided. According to the invention, in a process of electrodeposition of a film-forming material by passing an electric current through an aqueous dispersion of the material between an article to be coated and another electrode, the other electrode is separated from the aqueous dispersion or solution by an ion-exchange membrane selectively permeable to ions attracted to the other electrode.

Where the film-forming material is neutralised by a base the other electrode is the cathode and the membrane will be a cation-exchange membrane; where the film-forming material is neutralised by an acid, the other electrode is the anode and the membrane will be an anion-exchange membrane. During the coating process the film-forming material is deposited on the article and the ions of the neutraliser will pass through the membrane and be discharged at the other electrode. The membrane, being relatively impermeable to the discharged neutraliser and, due to its selective ionic nature, to the ionised film-forming material, effectively separates the discharged neutraliser from the main body of coating material. The discharged neutraliser can be removed by periodically or continuously flushing the electrolyte surrounding this other electrode and confined by the membrane, or if it has appreciable vapour pressure, by allowing it to evaporate from the electrolyte. The use of ion-exchange membranes has advantages over the use of unselective dialysis membranes, such as regenerated cellulosic films, to separate the catholyte and anolyte in that ion-exchange membranes normally have a much lower electrical resistance than dialysis membranes and, being selective, maintain better control over the pH value of the coating bath without as much need for constant flushing away of discharged neutraliser on the other side of the membrane. This better control over pH is particularly important when the plant is not in use for in this case an unselective dialysis membrane permits rapid rediffusion of discharged neutraliser into the main bath of coating material.

A further advantage of the use of a selective ion-exchange membrane is that the resistivity of the electrolyte in contact with the other electrode and confined by the membrane can be reduced by addition of simple ionisable materials, such as salts, without substantial risk of contamination of the main bath of coating material. Suitable salts include ammonium sulphate, sodium sulphate, soda ash and sodium bicarbonate. The concentration of such ionisable materials in the electrolyte may range from 0.002 to 0.5 N.

Suitable ion-exchange membranes include heterogeneous films prepared by incorporating finely divided ion-exchange resins in inert polymer matrices (for example, fine beads of sulphonated crosslinked polystyrene in polyethylene), homogeneous films derived from styrene/divinyl benzene copolymers by appropriate chemical treatments (for example, sulphonation to yield cation-exchangers or chloromethylation and amination to yield anion-exchangers), and films of graft copolymers comprising an inert back-bone and a reactive grafted component (such as styrene which can be activated as indicated above).

Preferably the membrane in the fully water-swollen state has a "pore" size of less than 20 A., for example in the region of 10–15 A. Also the membranes preferably have fixed ion concentrations of at least one unit and more preferably at least two units on the molarity scale, so that if the external concentration is not very high they conduct almost exclusively by the migration of counter-ions. Typical cation-exchange membranes have sodium ion transport numbers of at least 0.8, preferably 0.9 or greater, in sodium chloride solutions of 1 M concentration.

The ion-exchange membranes may be used in the form of self-contained electrode units comprising a hollow container in which the electrode itself is located, part of the walls of the container consisting essentially of the ion-exchange membrane and the remainder consisting of electrically non-conducting material, e.g. a rigid synthetic polymer such as polyvinyl chloride, polyethylene or polypropylene. The container is provided with an inlet and an outlet for flushing out the interior of the container and also with an electrical connection to the electrode. Preferably the container is of a flat box-like shape, the membrane providing one or both of the major walls of the box. In such units the membrane may be supported by an electrically non-conducting mesh or perforated structure.

Units of this type are readily removable from the coating bath for servicing or replacement.

The invention is illustrated by the following examples.

Example 1

A maleinised dehydrated castor oil solubilised with diethylamine as the basic neutraliser was diluted with de-ionised water to give an aqueous solution having a pH value of 8.6 at 10% solids by weight. A cation-exchange memberane 0.025 cm. thick, displaying a transport number for $Na^+$ in 1.0 M NaCl or 0.97 and an electrolytic resistance when immersed in 0.1 M NaCl at 25° C. of 35 ohm cm.$^2$, was used to separate a catholyte comprising aqueous M/10 diethylamine from the resin solution. The volume of anolyte and catholyte were in the ratio of 1.6:1.0. The cathode was comprised of mild steel. Degreased mild steel panels were coated anodically at 84 v. applied voltage, a total of 0.32 coulombs being passed per cm.$^2$ of anode surface during a total time of 2 minutes per panel. The ratio of anolyte volume to panel surface was 1.6 cm., i.e., 1.6 cc. per cm.$^2$ of panel surface.

After every 10 panels had been processed as above, the solids content and liquid level of the anolyte were restored to their initial values by adding the appropriate amounts of a 20% solids (by weight) solution of the maleinised oil in de-ionised water. The catholyte was not interfered with in any way.

After 80 panels had been processed, the pH of the anolyte was found to be 8.43 while the diethylamine concentration in the catholyte had risen to ca. 0.3 M.

This example provides an indication of the precision of pH control that is available by the method of this invention, even when relatively involatile neutralising amines are present.

Example 2

The maleinised oil of Example 1 was diluted was water to produce a solution containing 15% solids by weight. Vegetable carbon black was ground into the solution in a proportion of 5% by volume of the maleinised oil. The pigmented solution was then further diluted with water to a total solids concentration of 8.25% by weight. The pH was initially 8.35 and, after coating 20 panels as described in Example 1, it was 8.30. The first and last of these panels were stoved at 165° C. for 30 minutes; no difference between the resulting paint films was noticeable.

For purposes of comparison the same procedure was followed but with anodic panels and cathode in a single undivided compartment. The pH rose from 8.37 to 9.35 and the quality of the stoved films obtained deteriorated markedly, the 20th panel having a very rough and thin coating.

In both experiments described in this example, the throughput of anodic metal surface was at the high rate of 55 ft.$^2$ per gallon of anolyte per hour. Again, the precision of pH control by the method of this invention is illustrated.

Example 3

An aqueous coating composition was made up using a blend of low molecular weight maleinised oil-modified alkyd resin and an acidic phenolic resin. The blend was pigmented with vegetable black and the pigmented material was diluted with water using ammonia as the basic neutraliser to a solids content of 11% by weight. The resulting paint was used as the anolyte in the apparatus of Example 1, aqueous M/10 ammonia being used as the catholyte. Metal panels were coated at the rate described in Example 2. The pH value of the paint initially was 7.80 and after coating twenty panels was 7.72. There was no significant difference between the stoved coatings on the first and twentieth panels.

Example 4

A coating bath of capacity 5,000 gallons was fitted with 12 cation-exchange membrane units having a total membrane area of 108 square feet, and enclosing a total catholyte volume of about 40 gallons. The membrane was of the heterogeneous type containing sulphonated crosslinked polystyrene as the active constituent and had a fixed ion concentration of about 2.5 M and a sodium ion transport number in 1.0 M NaCl of greater than 0.9. The membrane provided one face of flat box-like containers, the other face and the side walls of the containers being made of rigid polyvinyl chloride. Inside the container was an electrode consisting of a metal plate mounted parallel to the membrane. The container was provided with an insulated electrical connection to the electrode and with inlet and outlet pipes for flushing out the interior. The units were placed in the bath with the membrane facing the work to be coated.

When the bath was filled with a pigmented coating composition containing 10% by weight of the blend of alkyd and phenolic resins described in Example 3 metal could be coated at a rate corresponding to an average current of 400 amperes. The total catholyte volume was replaced every hour, the flushing liquid used for this purpose being treated water containing 0.07% by weight of ammonium sulphate to reduce its resistivity. The pH value of the bath was still under control after a period of six months.

I claim:

1. A process of electro-deposition of a film-forming material which comprises passing an electric current through an aqueous dispersion containing ionized film-forming material and ions of opposite charge from said ionized film-forming material, between an article to be coated and another electrode, the other electrode being separated from the aqueous dispersion by an ion-exchange membrane selectively permeable to said ions of opposite charge which are attracted to the other electrode where they form discharged neutralizer, said membrane being relatively impermeable to said discharged neutralizer and to said ionized film-forming material.

2. A process as claimed in claim 1 in which the membrane is a cation-exchange membrane having a sodium ion transport number of at least 0.8 in sodium chloride solutions of 1 M concentration.

3. A process as claimed in claim 1 in which the membrane is a cation-exchange membrane having a sodium transport number of at least 0.9 in sodium chloride solutions of 1 M concentration.

4. A process as claimed in claim 1 in which the membrane has a fixed ion concentration of at least one unit on the molarity scale.

5. A process as claimed in claim 1 in which the membrane in the fully water-swollen state has a "pore" size of less than 20 Å.

6. A process as claimed in claim 1 in which the membrane in the fully water-swollen state has a "pore" size of 10–15 A. and a fixed ion concentration of at least two units on the molarity scale.

7. A process as claimed in claim 3 in which the membrane in the fully water-swollen state has a "pore" size of 10–15 A. and a fixed ion concentration of at least two units on the molarity scale.

References Cited

UNITED STATES PATENTS

| | | | |
|---|---|---|---|
| 2,800,447 | 7/1957 | Graham | 204—181 |
| 3,230,162 | 1/1966 | Gilchrist | 204—181 |
| 3,304,250 | 2/1967 | Gilchrist | 204—181 |

OTHER REFERENCES

Mason et al.: "Applications of Ion-Exchange Membranes in Electrodialysis," presented to American Institute of Chemical Engineers, September 1957, 204–180P, pp. 1 to 15.

Monet: "Similarities in Adsorption, Dialysis and Ion Exchange," Chemical Engineering Progress Symposium Series, No. 24, vol. 55, 1959, 204–180P, pp. 1–15.

JOHN H. MACK, *Primary Examiner.*

E. ZAGARELLA, *Assistant Examiner.*